United States Patent
Waddell et al.

(10) Patent No.: US 10,584,647 B1
(45) Date of Patent: Mar. 10, 2020

(54) OFFSET PARALLEL VALVES WITH LINKAGE SYSTEM

(71) Applicant: United Technologies Corporation, Farmington, CT (US)

(72) Inventors: Matthew C. Waddell, Brimfield, MA (US); Jesse W. Clauson, Agawam, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/123,317

(22) Filed: Sep. 6, 2018

(51) Int. Cl.
*F16K 1/22* (2006.01)
*F02D 9/10* (2006.01)
*F16K 11/22* (2006.01)
*F02B 29/04* (2006.01)
*F02D 9/02* (2006.01)

(52) U.S. Cl.
CPC ............ *F02D 9/1065* (2013.01); *F16K 1/221* (2013.01); *F16K 1/223* (2013.01); *F16K 11/22* (2013.01); *F02B 29/0418* (2013.01); *F02D 2009/0254* (2013.01); *Y10T 137/87129* (2015.04)

(58) Field of Classification Search
CPC .......... F16K 11/22; F16K 1/223; F16K 1/221; F02D 9/1065; Y10T 137/87121; Y10T 137/87129
USPC ............... 137/625.18, 625.198, 637.2, 637.3
See application file for complete search history.

(56) References Cited

U.S. PATENT DOCUMENTS

| | | | |
|---|---|---|---|
| 7,556,021 B2 * | 7/2009 | Toriumi et al. | F02M 35/10032 123/337 |
| 7,699,076 B2 * | 4/2010 | Minnick | F16K 5/0642 137/625.19 |
| 7,806,096 B2 | 10/2010 | Grant | |
| 9,004,031 B1 * | 4/2015 | Choi | F01L 13/0036 123/90.16 |
| 9,765,732 B2 * | 9/2017 | Weis | F02M 35/10255 |
| 2008/0029062 A1 * | 2/2008 | Toriumi et al. | F02M 35/10032 123/337 |
| 2013/0220041 A1 * | 8/2013 | Katayama et al. | F01L 1/044 74/54 |

FOREIGN PATENT DOCUMENTS

| DE | 3901264 A1 | 8/1989 |
|---|---|---|
| WO | 2015155528 A1 | 10/2015 |

* cited by examiner

*Primary Examiner* — Kevin L Lee
(74) *Attorney, Agent, or Firm* — Cantor Colburn LLP

(57) ABSTRACT

An aspect includes an offset parallel valve system that includes a first valve body and a first valve disc operably disposed within the first valve body. The offset parallel valve system also includes a second valve body in parallel with the first valve body and a second valve disc operably disposed within the second valve body, where the second valve disc is laterally offset from the first valve disc. A linkage system is operably coupled to the first valve disc and the second valve disc. The linkage system includes an armature coupled to a grooved linkage member having a first groove and a second groove. The first groove delays movement of the second valve disc as the first valve disc rotates, and the second groove controls a rotation angle of the second valve disc.

20 Claims, 7 Drawing Sheets

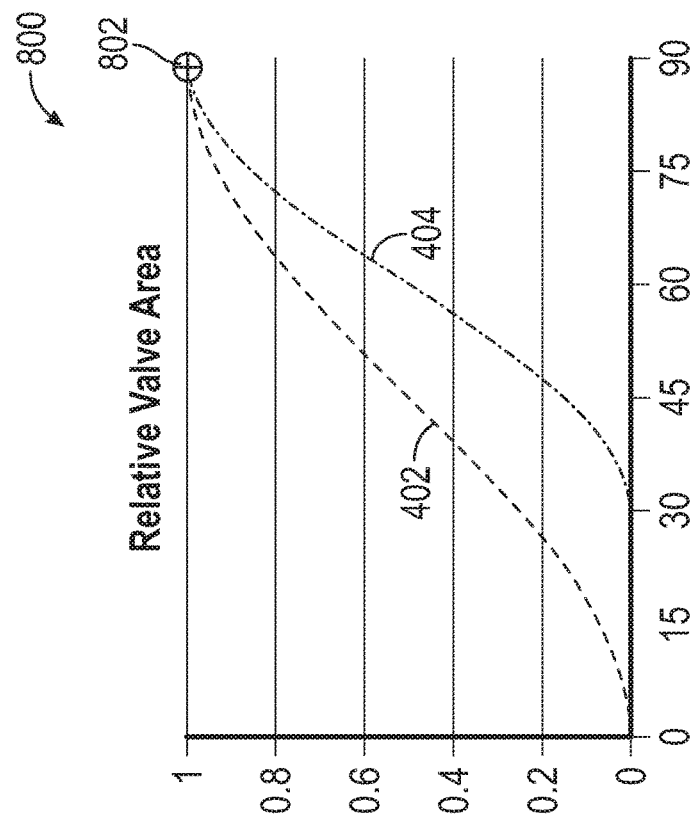
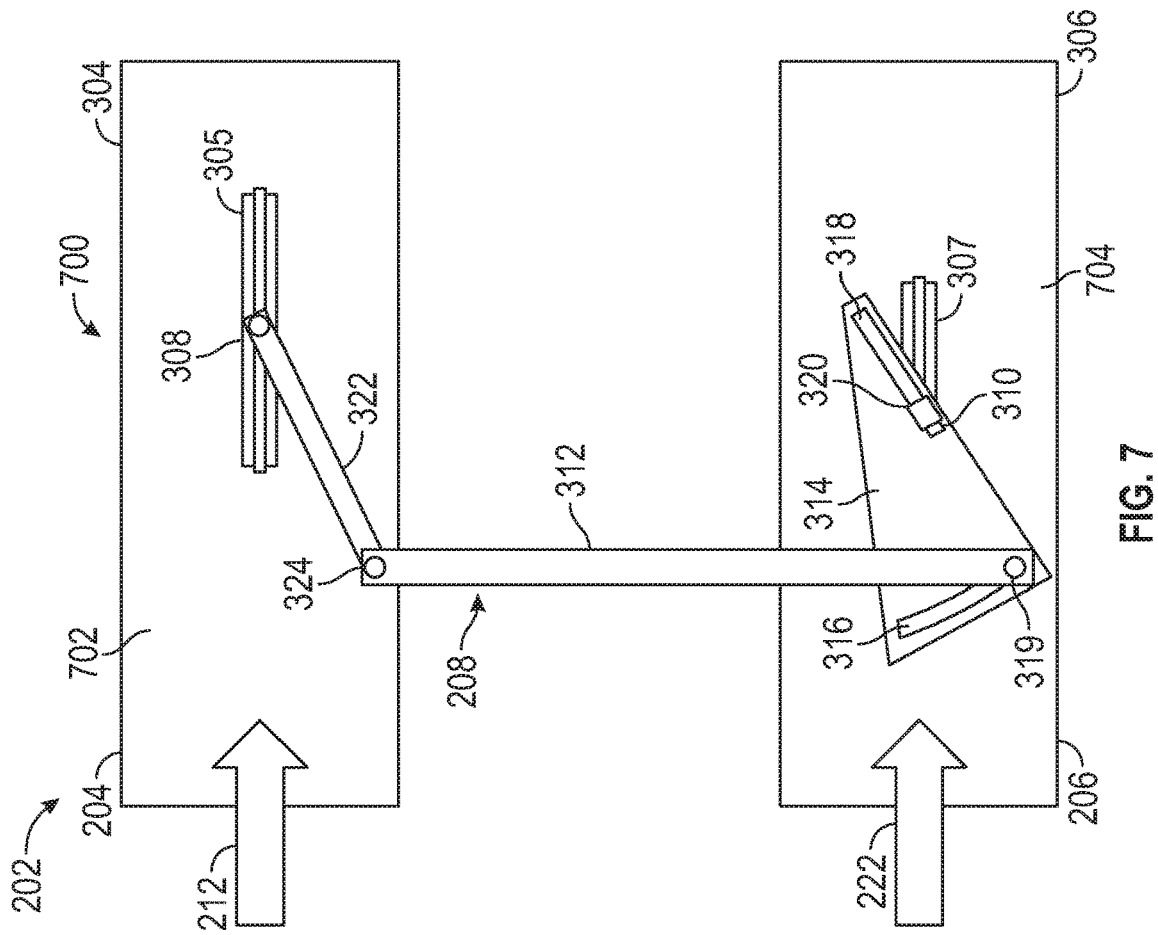

US 10,584,647 B1

OFFSET PARALLEL VALVES WITH LINKAGE SYSTEM

BACKGROUND

The subject matter disclosed herein generally relates to flow control systems and, more particularly, to a method and apparatus for offset parallel valves with a linkage system.

Pneumatic systems, such as airflow control systems on an aircraft, can use multiple valves with multiple actuators to control delivery of an airflow for various purposes. Components receiving the airflow may have different requirements for timing or conditions under which the airflow should be received. Using a dedicated actuator for each valve to be controlled can support a wide range of control sequences between multiple valves; however, each actuator adds weight and complexity to the overall system.

BRIEF DESCRIPTION

According to one embodiment, an offset parallel valve system includes a first valve body and a first valve disc operably disposed within the first valve body. The offset parallel valve system also includes a second valve body in parallel with the first valve body and a second valve disc operably disposed within the second valve body, where the second valve disc is laterally offset from the first valve disc. A linkage system is operably coupled to the first valve disc and the second valve disc. The linkage system includes an armature coupled to a grooved linkage member having a first groove and a second groove. The first groove delays movement of the second valve disc as the first valve disc rotates, and the second groove controls a rotation angle of the second valve disc.

In addition to one or more of the features described above or below, or as an alternative, further embodiments may include where the first valve body and the first valve disc form a first butterfly valve, and the second valve body and the second valve disc form a second butterfly valve.

In addition to one or more of the features described above or below, or as an alternative, further embodiments may include where the first groove includes an arcuate slot, and the armature is coupled to the first groove by a round pin in the arcuate slot.

In addition to one or more of the features described above or below, or as an alternative, further embodiments may include where the second groove includes a linear slot, and the second valve disc is coupled to the second groove by a rectangular pin in the linear slot.

In addition to one or more of the features described above or below, or as an alternative, further embodiments may include where the linkage system further includes a crank linkage operably coupled to the armature and a first pivot point of the first valve disc, and the rectangular pin is operably coupled to a second pivot point of the second valve disc.

In addition to one or more of the features described above or below, or as an alternative, further embodiments may include where the armature is arranged substantially perpendicular to the first valve body and the second valve body.

In addition to one or more of the features described above or below, or as an alternative, further embodiments may include where the armature and the grooved linkage member are arranged substantially in parallel with the first valve body and the second valve body.

According to another embodiment, pneumatic system for a gas turbine engine includes a first pneumatic tube config-ured to receive a first airflow from the gas turbine engine, a first valve body coupled to the first pneumatic tube, a first valve disc operably disposed within the first valve body, a second pneumatic tube configured to receive a second airflow from the gas turbine engine, a second valve body coupled to the second pneumatic tube, the second valve body in parallel with the first valve body, and second valve disc operably disposed within the second valve body, the second valve disc laterally offset from the first valve disc. The pneumatic system also includes a linkage system operably coupled to the first valve disc and the second valve disc, where the linkage system includes an armature coupled to a grooved linkage member having a first groove and a second groove, the first groove configured to delay movement of the second valve disc as the first valve disc rotates and the second groove controlling a rotation angle of the second valve disc.

According to another embodiment, a method of operating an offset parallel valve system includes driving a first valve disc to rotate using an actuator and translating a rotational force of the actuator through a linkage system operably coupled to the first valve disc and a second valve disc. The linkage system includes an armature driven by the actuator and coupled to a grooved linkage member having a first groove and a second groove, the first groove delaying movement of the second valve disc as the first valve disc rotates and the second groove controlling a rotation angle of the second valve disc.

In addition to one or more of the features described above or below, or as an alternative, further embodiments may include where the first groove includes an arcuate slot, the armature is coupled to the first groove by a round pin in the arcuate slot, the second groove includes a linear slot, and the second valve disc is coupled to the second groove by a rectangular pin in the linear slot.

A technical effect of the apparatus, systems and methods is achieved by providing offset parallel valves with a linkage system as described herein.

BRIEF DESCRIPTION OF THE DRAWINGS

The following descriptions should not be considered limiting in any way. With reference to the accompanying drawings, like elements are numbered alike:

FIG. 7 is a schematic diagram of an offset parallel valve system in a third state, in accordance with an embodiment of the disclosure;

FIG. 8 is a plot of relative valve area, in accordance with an embodiment of the disclosure;

DETAILED DESCRIPTION

A detailed description of one or more embodiments of the disclosed apparatus and method are presented herein by way of exemplification and not limitation with reference to the Figures.

Figure 1:
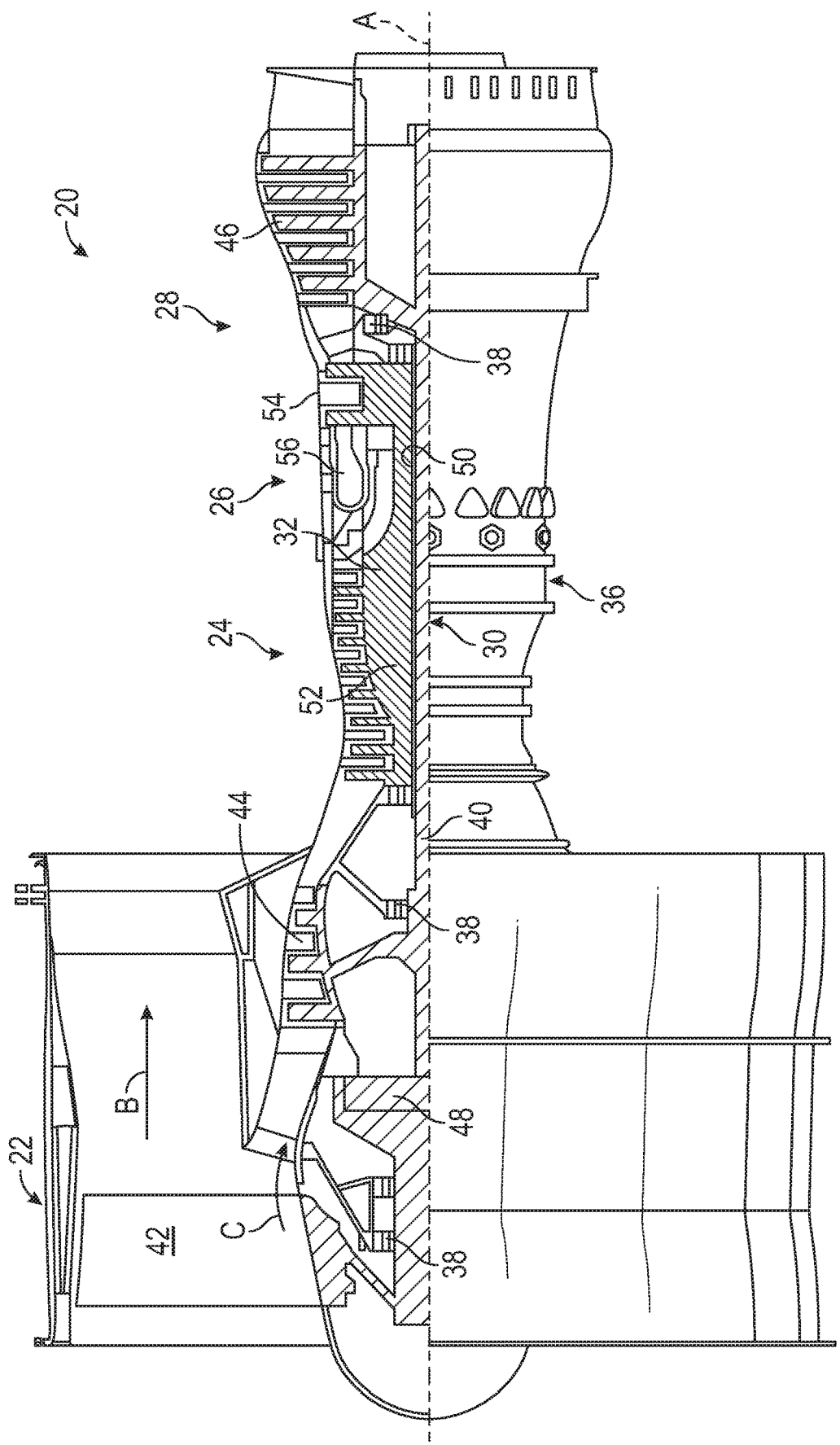
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
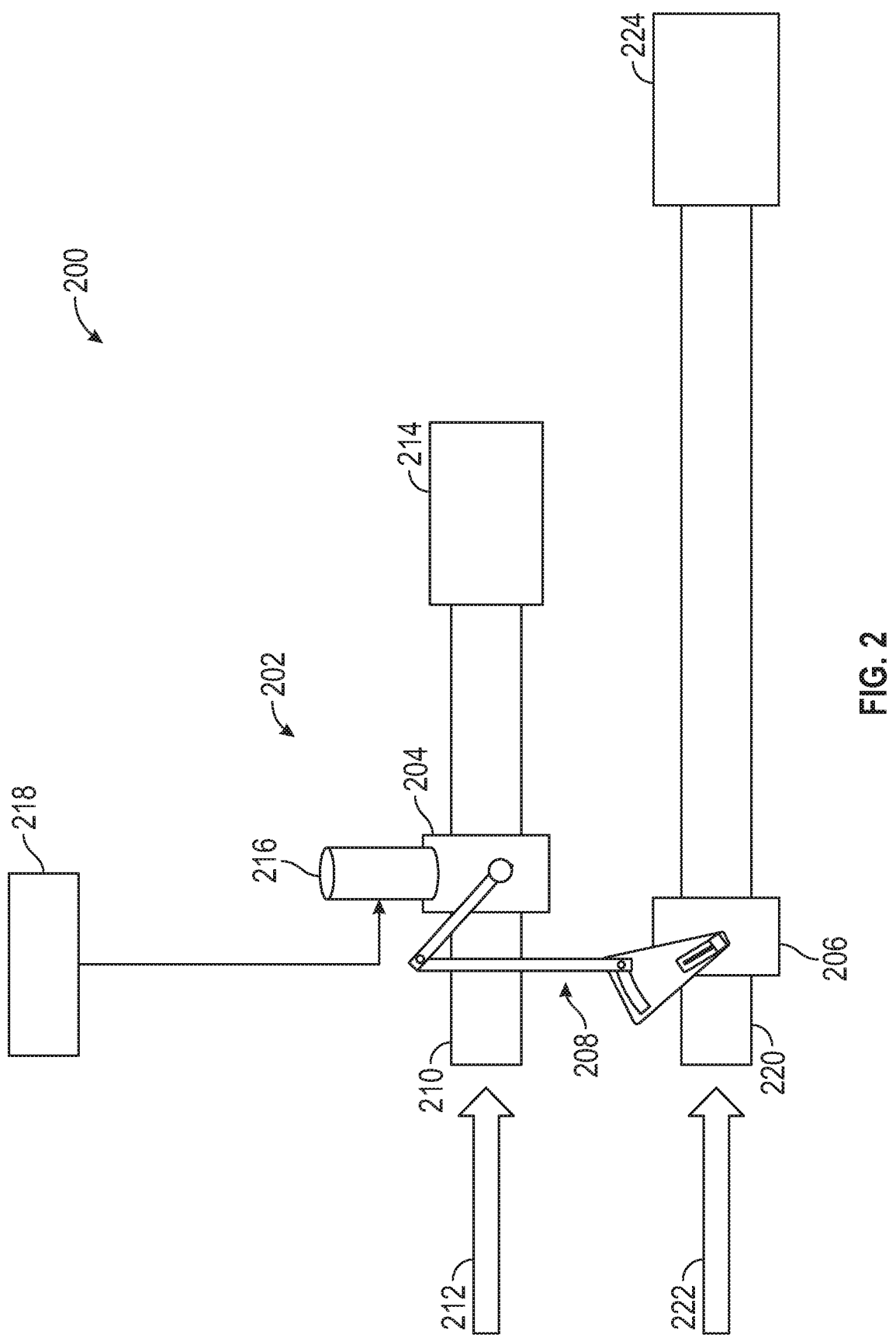
FIG. 2 is a schematic diagram of a pneumatic system including an offset parallel valve system, in accordance with an embodiment of the disclosure.
Figure 4:
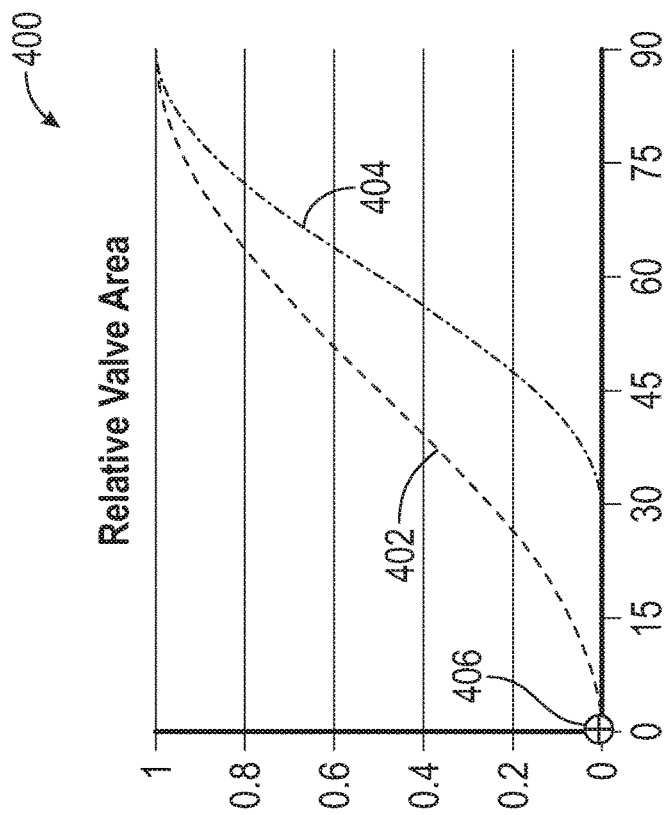
FIG. 4 is a plot of relative valve area, in accordance with an embodiment of the disclosure.

FIG. 2 illustrates a pneumatic system 200 that includes an offset parallel valve system 202 with a first valve 204 operably coupled to a second valve 206 by a linkage system 208. The first valve 204 is fluidly coupled to a first pneumatic tube 210 configured to receive a first airflow 212 from an air source, such as an airflow of the gas turbine engine 20 of FIG. 1. The first valve 204 selectively enables a first airflow use 214 to receive all, a portion, or substantially none of the first airflow 212 through the first pneumatic tube 210 responsive to an actuator 216. Similarly, the second valve 206 is fluidly coupled to a second pneumatic tube 220 configured to receive a second airflow 222 from an air source, such as an airflow of the gas turbine engine 20 of FIG. 1. The second valve 206 selectively enables a second airflow use 224 to receive all, a portion, or substantially none of the second airflow 222 through the second pneumatic tube 220 responsive to the actuator 216. In the example of FIG. 2, the first valve 204 can be directly driven by the actuator 216, while the second valve 206 is driven through the linkage system 208 responsive to a rotational force of the actuator 216. Alternatively, the actuator 216 may directly drive the linkage system 208 coupled to the first valve 204 and the second valve 206.

A controller 218 can control operation of the actuator 216, where the controller 218 may also control other system aspects, such as controlling operation of the gas turbine engine 20 of FIG. 1. In embodiments, the controller 218 can include a processing system, a memory system, an input/output interface, and other such systems known in the art.

As one example configuration, the pneumatic system 200 can supply the first airflow 212 and the second airflow 222 for active clearance control of the gas turbine engine 20 of FIG. 1. Active clearance control can reduce blade tip to shroud clearance within the gas turbine engine 20 by regulating thermal expansion of engine structures through controlled delivery of cooling air to targeted locations. The first valve 204 and the second valve 206 may each have different characteristics to establish a specific flow split relationship between the first airflow use 214 and the second airflow use 224. For instance, the first airflow use 214 can provide cooling air to a portion of the high pressure turbine 54 of FIG. 1, and the second airflow use 224 can provide cooling air to a portion of the low pressure turbine 46 of FIG. 1. In embodiments, the first airflow 212 and the second airflow 222 may originate from a common portion of the gas turbine engine 20, such as an engine bleed of the compressor section 24 and/or bypass air from the fan section 22 of FIG. 1. Using a flow split relationship that allows cooling air of the first airflow 212 to reach the first airflow use 214 prior to allowing cooling air of the second airflow 222 to reach the second airflow use 224 may increase performance and TSFC of the gas turbine engine 20. The linkage system 208 can enable a single instance of the actuator 216 to control the state of the first valve 204 and the second valve 206, while delayed opening of the second valve 206 relative to the first valve 204 may be achieved, for example, by characteristics of the linkage system 208, as further described herein.

Figure 3:
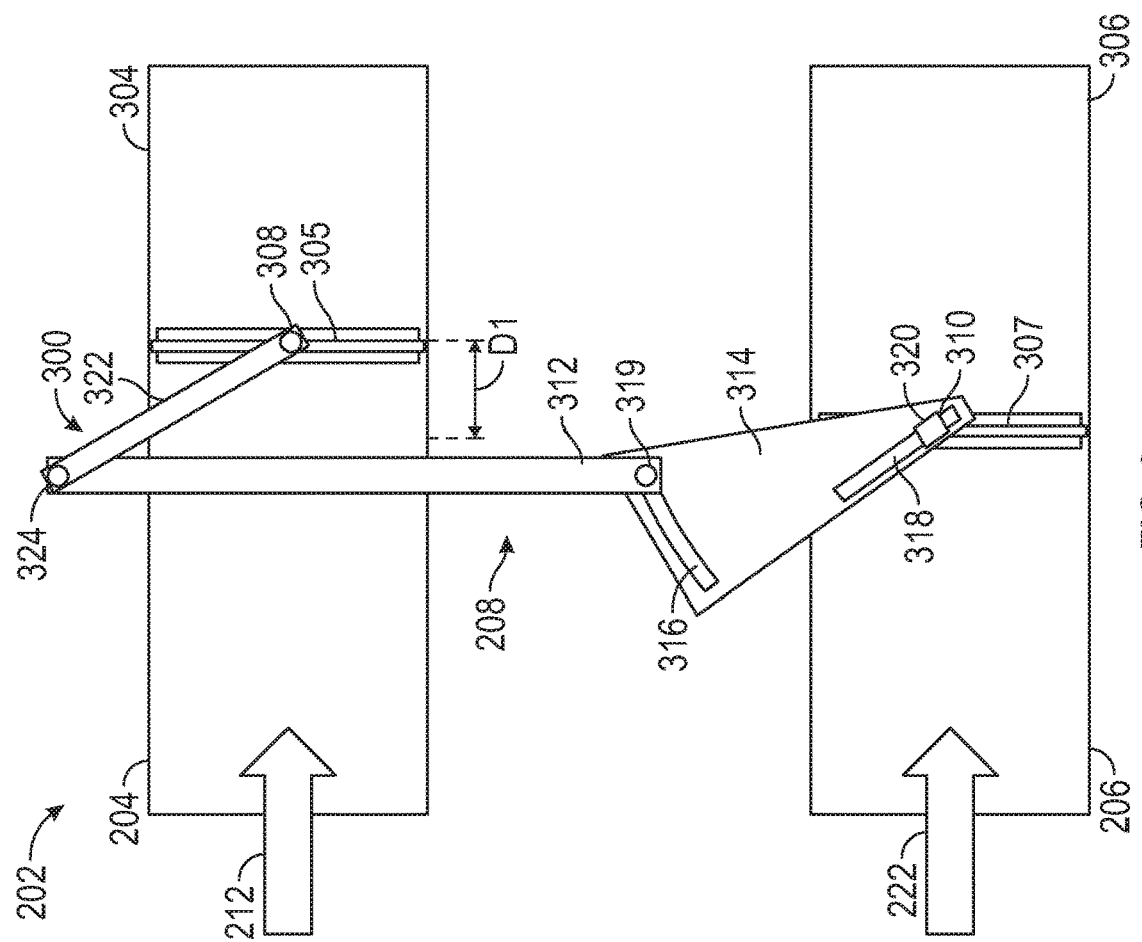
FIG. 3 is a schematic diagram of an offset parallel valve system in a first state, in accordance with an embodiment of the disclosure.
Figure 6:
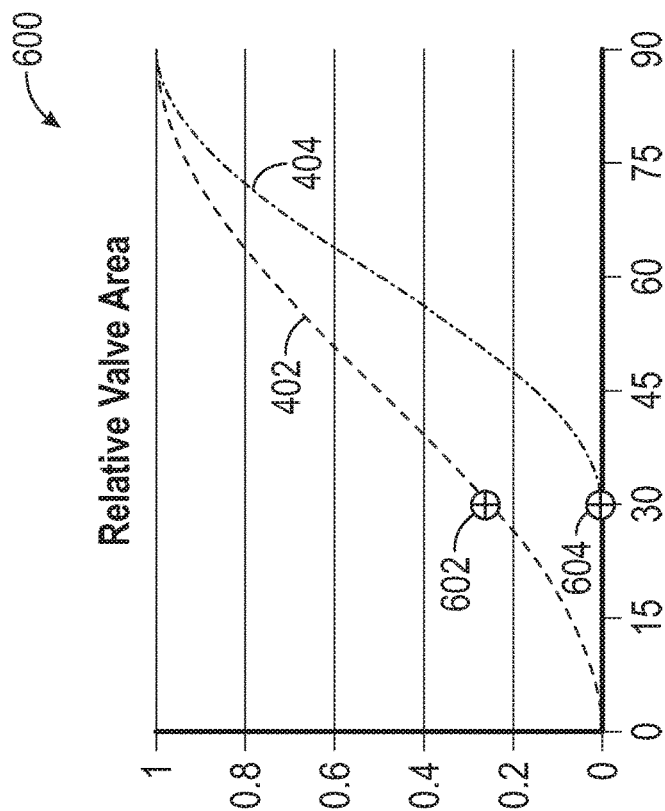
FIG. 6 is a plot of relative valve area, in accordance with an embodiment of the disclosure.

FIG. 3 is a schematic diagram of the offset parallel valve system 202 in greater detail in a first state 300 according to an embodiment. The first valve 204 and the second valve 206 may each be a butterfly valve (e.g., a first butterfly valve and a second butterfly valve). The first valve 204 can include a first valve body 304 and a first valve disc 305 operably disposed within the first valve body 304. The second valve 206 can include a second valve body 306 and a second valve disc 307 operably disposed within the second valve body 306. The second valve body 306 can be arranged in parallel with the first valve body 304, and the second valve disc 307 can be laterally offset by a distance D1 from the first valve disc 305. For example, a first pivot point 308 of the first valve disc 305 can be non-perpendicularly aligned with a second pivot point 310 of the second valve disc 307 relative to the parallel alignment of the first and second valve bodies 304, 306. The linkage system 208 can be operably coupled to the first valve disc 305 at the first pivot point 308 and coupled to the second valve disc 307 at the second pivot point 310. The offset parallel valve system 202 can be configured such that opening of a first flow area (e.g., first flow area 502, 702 of FIGS. 5 and 7) between the first valve body 304 and the first valve disc 305 occurs prior to opening of a second flow area (e.g., second flow area 504, 704 of FIGS. 5 and 7) between the second valve body 306 and the second valve disc 307 responsive to movement of the linkage system 208.

The linkage system 208 includes an armature 312 coupled to a grooved linkage member 314 having a first groove 316 and a second groove 318. The first groove 316 delays movement of the second valve disc 307 (e.g., provides hysteresis) as the first valve disc 305 rotates, and the second groove 318 controls a rotation angle of the second valve disc 307, as further described herein with respect to FIGS. 3-8. In the example of FIG. 3, the first groove 316 is an arcuate slot, and the armature 312 is coupled to the first groove 316 by a round pin 319 in the arcuate slot. The second groove 318 can be a linear slot, and the second valve disc 307 is coupled to the second groove 318 by a rectangular pin 320 in the linear slot. The rectangular pin 320 can be operably coupled to the second pivot point 310 of the second valve disc 307. The linkage system 208 can also include a crank linkage 322 operably coupled to the armature 312 at a third pivot point 324 and at the first pivot point 308 of the first valve disc 305.

Movement of the round pin 319 in the first groove 316 allows the first valve disc 305 to rotate responsive to movement of the armature 312 and crank arm 322, while the grooved linkage member 314 remains substantially static. As the round pin 319 completes travel in the first groove 316, the grooved linkage member 314 rotates, resulting in rotation of the second valve disc 307 as the rectangular pin 320 slides in the second groove 318. Sizing of the first groove 316 can impact the delay time between rotation of the first and second valve discs 305, 307. Sizing of the second groove 318 can define a range of rotation of the second valve disc 307.

The first state 300 of the offset parallel valve system 202 in FIG. 3 is depicted with both the first valve disc 305 and the second valve disc 307 fully closed at a position a zero degrees, as further illustrated in plot 400, where a first relative valve area 402 of the first valve 204 (e.g., scaled between 0 and 1) is depicted for a range of angles of the first valve disc 305 pivoting with respect to the first valve body 304 between zero and ninety degrees. The plot 400 also depicts an example of the delay of a second relative valve area 404 of the second valve 206 for a range of angles of the second valve disc 307 pivoting with respect to the second valve body 306 between zero and ninety degrees. A marker 406 on plot 400 indicates the state of the first valve 204 and the second valve 206 as configured in FIG. 3, e.g., both at a position of zero degrees and fully closed. It will be understood that the plot 400 is merely one example of a possible delay relationship between first valve 204 and the second valve 206, and other variations are contemplated.

Figure 5:
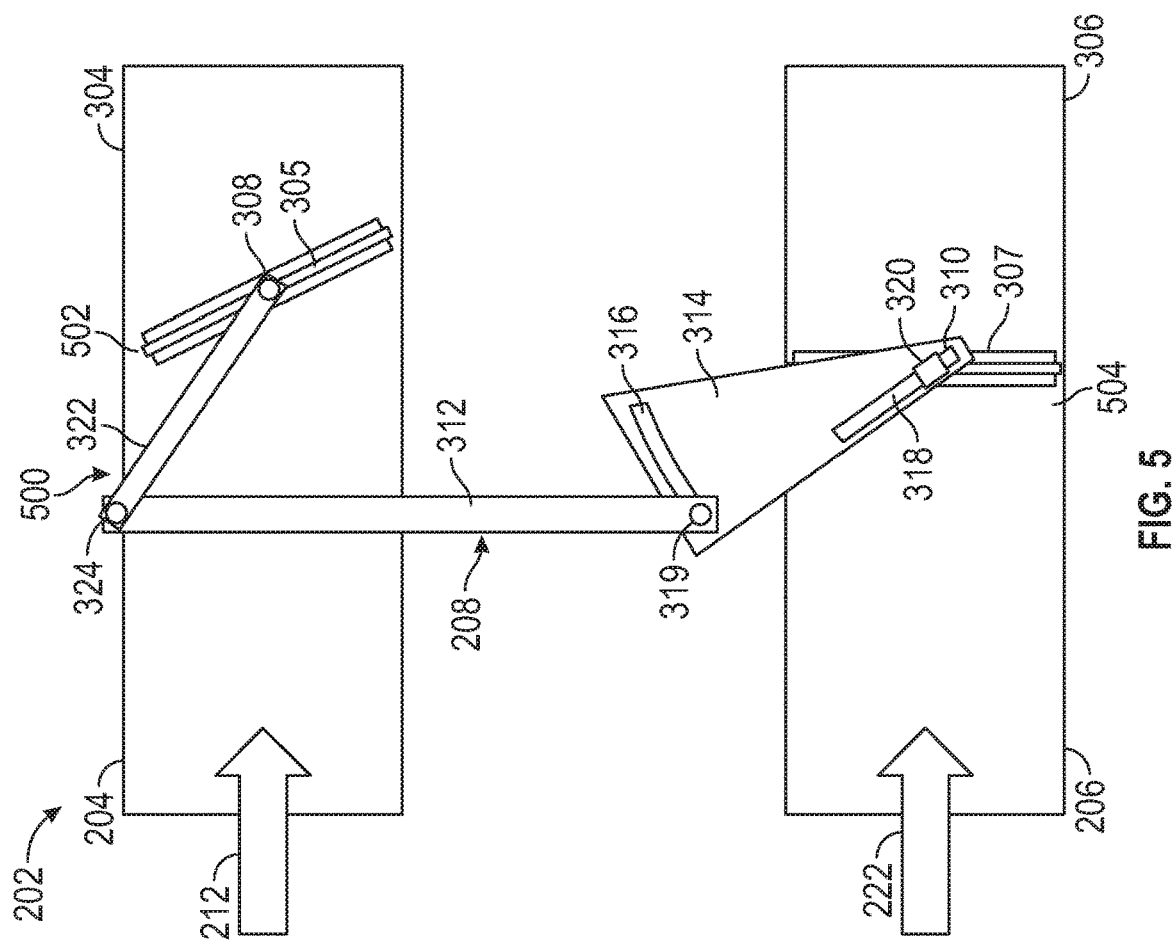
FIG. 5 is a schematic diagram of an offset parallel valve system in a second state, in accordance with an embodiment of the disclosure.

FIG. 5 depicts a second state 500 of the offset parallel valve system 202 as another example, where the first valve disc 305 is rotated to a position of about 30 degrees relative to the first valve body 304 and the grooved linkage member 314 absorbs the rotation without rotating the second valve disc 307. In an example plot 600 of FIG. 6, it can be seen that the second state 500 may result in a first relative valve area 402 of about 25% at marker 602, which allows a portion of the first airflow 212 to pass through the first valve 204 towards the first airflow use 214 of FIG. 2. However, the second valve 206 remains with a very small (near 0%) value for the second relative valve area 404 as seen at marker 604 on the example plot 600.

FIG. 7 depicts a third state 700 of the offset parallel valve system 202 as another example, where the first valve disc 305 and the second valve disc 307 are both rotated to a position of about 90 degrees (e.g., maximum open) relative to the first valve body 304 and the second valve body 306 about pivot points 308, 310 respectively. In an example plot 800 of FIG. 8, it can be seen that the third state 700 may result in a first relative valve area 402 and a second relative valve area 404 of about 100% at marker 802, which allows the first airflow 212 to pass through the first valve 204 towards the first airflow use 214 and the second airflow 222 to pass through the second valve 206 towards the second airflow use 224 of FIG. 2.

Figure 9:
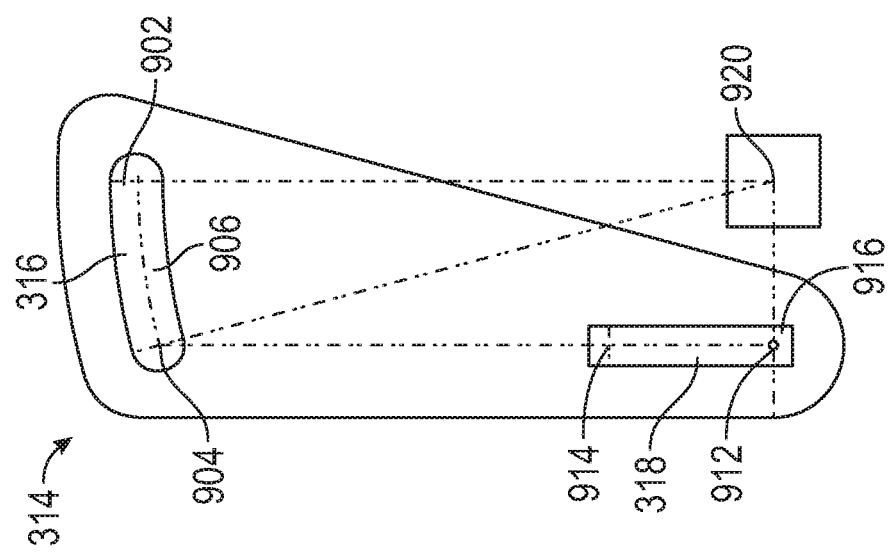
FIG. 9 is a schematic diagram of a grooved linkage member, in accordance with an embodiment of the disclosure.

FIG. 9 depict an example of the grooved linkage member 314 in greater detail. The first groove 316 can include a first rounded endpoint 902 and a second rounded endpoint 904 that define an arcuate slot 906 to support travel of the round pin 319. The second groove 318 can include a first rectangular endpoint 912 and a second rectangular endpoint 914 that define a linear slot 916. A reference point 920 can be define at an intersection of orthogonal projections from the first rounded endpoint 902 of the arcuate slot 906 and the first rectangular endpoint 912 of the linear slot 916. The first rectangular endpoint 912 and the second rectangular endpoint 914 that define the linear slot 916 can linearly align with the second rounded endpoint 904 of the arcuate slot 906.

Figure 10:
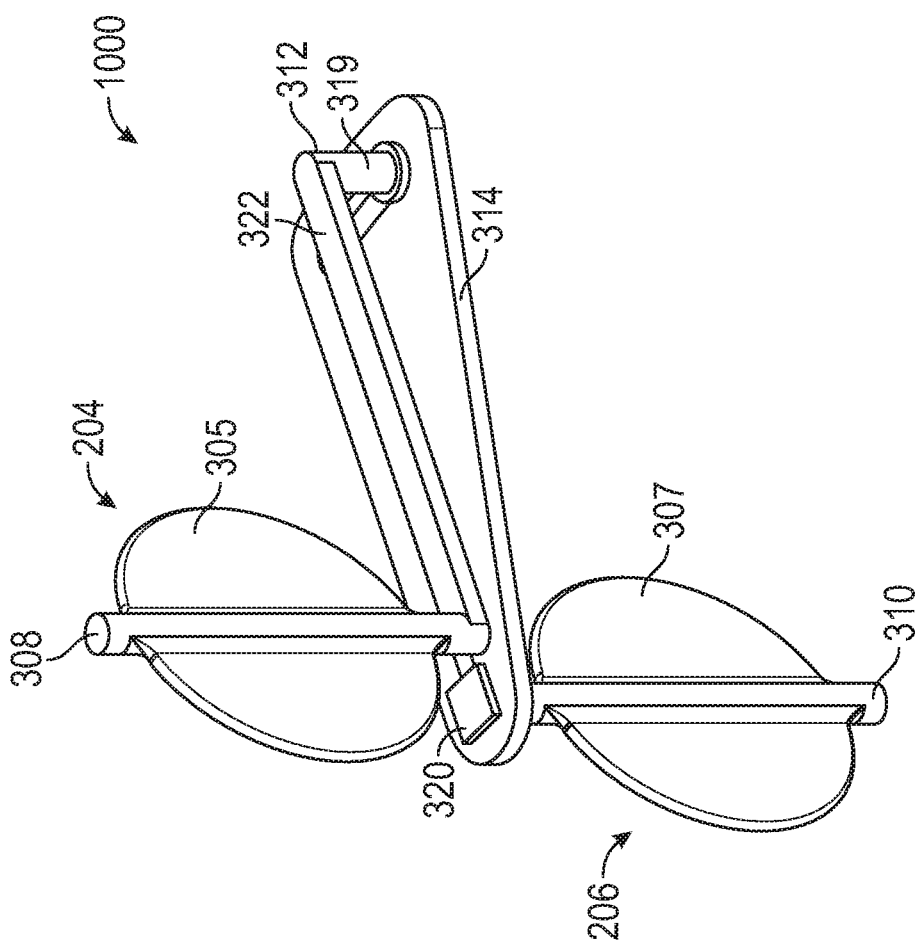
FIG. 10 is a schematic diagram of an offset parallel valve system, in accordance with an embodiment of the disclosure.

FIG. 10 depicts an alternate embodiment of the linkage system 208 of FIGS. 2, 3, 5, and 7 as a linkage system 1000, which can be part of an offset parallel valve system. In the examples of FIGS. 2, 3, 5, and 7, the armature 312 is arranged substantially perpendicular to the first valve 204 and the second valve 206. In the example of FIG. 10, the crank linkage 322 and the grooved linkage member 314 are arranged substantially in parallel with the first valve 204 and the second valve 206 (e.g., first valve body 304 and second valve body 306). Thus, the arrangement of the linkage system 1000 may be better suited for applications where the first and second valves 204, 206 are in closer physical proximity, while the linkage system 208 may be better suited for applications where the first and second valves 204, 206 are separated by a greater physical distance. Further, the linkage system 1000 may be driven by the actuator 216 of FIG. 2 directly driving rotation of the first valve disc 305 about the first pivot point 308 with the rotational force translated through the armature 312 and grooved linkage member 314 to drive rotation of the second valve disc 307 about the second pivot point 310. In contrast, the linkage system 208 may support the armature 312 being directly driven by the actuator 216. Further, the linkage system 1000 may eliminate the third pivot point 324 that is part of the linkage system 208 of FIGS. 3, 5, and 7.

Figure 11:
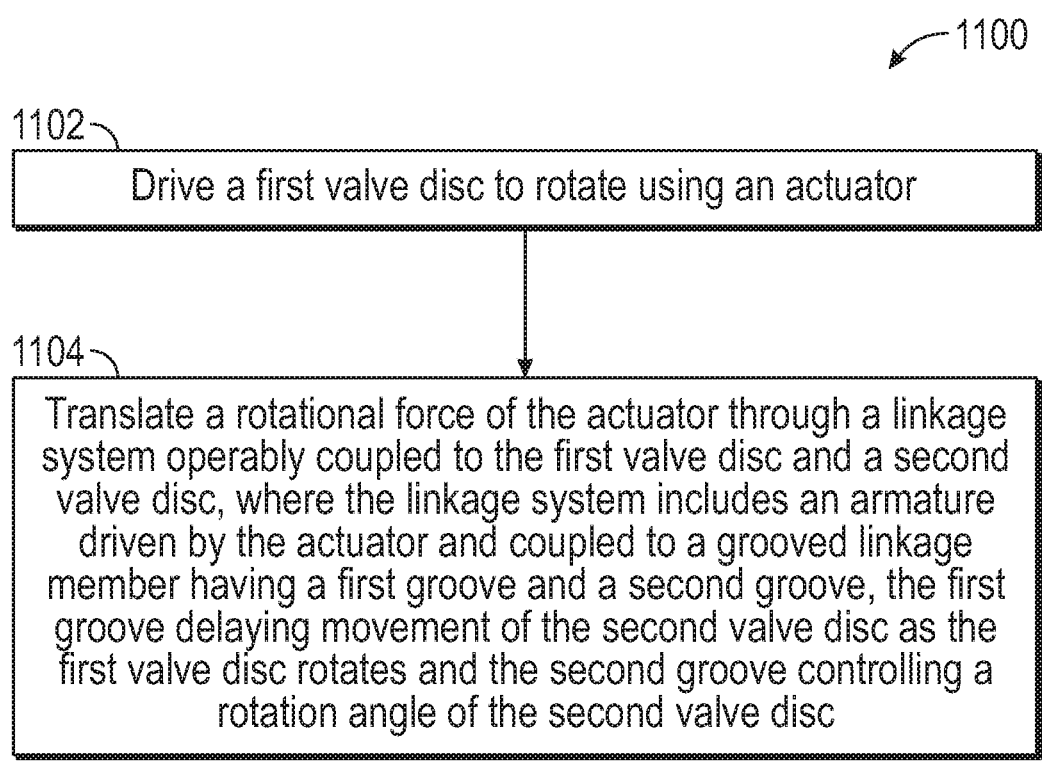
FIG. 11 is a flow chart illustrating a method, in accordance with an embodiment of the disclosure.

Referring now to FIG. 11 with continued reference to FIGS. 1-10, FIG. 11 is a flow chart illustrating a method 1100 of operating the offset parallel valve system 202, in accordance with an embodiment. The method 1100 may be performed, for example, by the pneumatic system 200 of FIG. 2. For purposes of explanation, the method 1100 is described primarily with respect to the pneumatic system 200; however, it will be understood that the method 1100 can be performed on other configurations (not depicted).

At block 1102, the first valve disc 305 is driven to rotate using the actuator 216. At block 1104, a rotational force of the actuator 216 is translated through a linkage system 208, 1000 operably coupled to the first valve disc 305 and a second valve disc 307, where the linkage system 208, 1000 includes an armature 312 driven by the actuator 216 and coupled to a grooved linkage member 314 having a first groove 316 and a second groove 318. The first groove 316 can delay movement of the second valve disc 307 as the first valve disc 305 rotates, and the second groove 318 can control a rotation angle of the second valve disc 307.

While the above description has described the flow process of FIG. 11 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An offset parallel valve system comprising:
   a first valve body;
   a first valve disc operably disposed within the first valve body;
   a second valve body in parallel with the first valve body;
   a second valve disc operably disposed within the second valve body, the second valve disc laterally offset from the first valve disc; and
   a linkage system operably coupled to the first valve disc and the second valve disc, wherein the linkage system comprises an armature coupled to a grooved linkage member having a first groove and a second groove, the first groove configured to delay movement of the second valve disc as the first valve disc rotates and the second groove controlling a rotation angle of the second valve disc.

2. The offset parallel valve system of claim 1, wherein the first valve body and the first valve disc form a first butterfly valve, and the second valve body and the second valve disc form a second butterfly valve.

3. The offset parallel valve system of claim 1, wherein the first groove comprises an arcuate slot, and the armature is coupled to the first groove by a round pin in the arcuate slot.

4. The offset parallel valve system of claim 3, wherein the second groove comprises a linear slot, and the second valve disc is coupled to the second groove by a rectangular pin in the linear slot.

5. The offset parallel valve system of claim 4, wherein the linkage system further comprises a crank linkage operably coupled to the armature and a first pivot point of the first valve disc, and the rectangular pin is operably coupled to a second pivot point of the second valve disc.

6. The offset parallel valve system of claim 1, wherein the armature is arranged substantially perpendicular to the first valve body and the second valve body.

7. The offset parallel valve system of claim 1, wherein the armature and the grooved linkage member are arranged substantially in parallel with the first valve body and the second valve body.

8. A pneumatic system for a gas turbine engine, the pneumatic system comprising:
    a first pneumatic tube configured to receive a first airflow from the gas turbine engine;
    a first valve body coupled to the first pneumatic tube;
    a first valve disc operably disposed within the first valve body;
    a second pneumatic tube configured to receive a second airflow from the gas turbine engine;
    a second valve body coupled to the second pneumatic tube, the second valve body in parallel with the first valve body;
    a second valve disc operably disposed within the second valve body, the second valve disc laterally offset from the first valve disc; and
    a linkage system operably coupled to the first valve disc and the second valve disc, wherein the linkage system comprises an armature coupled to a grooved linkage member having a first groove and a second groove, the first groove configured to delay movement of the second valve disc as the first valve disc rotates and the second groove controlling a rotation angle of the second valve disc.

9. The pneumatic system of claim 8, wherein the first valve body and the first valve disc form a first butterfly valve, and the second valve body and the second valve disc form a second butterfly valve.

10. The pneumatic system of claim 8, wherein the first groove comprises an arcuate slot, and the armature is coupled to the first groove by a round pin in the arcuate slot.

11. The pneumatic system of claim 10, wherein the second groove comprises a linear slot, and the second valve disc is coupled to the second groove by a rectangular pin in the linear slot.

12. The pneumatic system of claim 11, wherein the linkage system further comprises a crank linkage operably coupled to the armature and a first pivot point of the first valve disc, and the rectangular pin is operably coupled to a second pivot point of the second valve disc.

13. The pneumatic system of claim 8, wherein the armature is arranged substantially perpendicular to the first valve body and the second valve body.

14. The pneumatic system of claim 8, wherein the armature and the grooved linkage member are arranged substantially in parallel with the first valve body and the second valve body.

15. A method of operating an offset parallel valve system, the method comprising:
    driving a first valve disc to rotate using an actuator; and
    translating a rotational force of the actuator through a linkage system operably coupled to the first valve disc and a second valve disc, wherein the linkage system comprises an armature driven by the actuator and coupled to a grooved linkage member having a first groove and a second groove, the first groove delaying movement of the second valve disc as the first valve disc rotates and the second groove controlling a rotation angle of the second valve disc.

16. The method of claim 15, wherein the first groove comprises an arcuate slot, the armature is coupled to the first groove by a round pin in the arcuate slot, the second groove comprises a linear slot, and the second valve disc is coupled to the second groove by a rectangular pin in the linear slot.

17. The method of claim 16, wherein the linkage system further comprises a crank linkage operably coupled to the armature and a first pivot point of the first valve disc, and the rectangular pin is operably coupled to a second pivot point of the second valve disc.

18. The method of claim 15, wherein the first valve disc is operably disposed within a first valve body, the second valve disc is operably disposed within a second valve body, the first valve body and the second valve body are arranged substantially parallel to each other, and the second valve disc is laterally offset from the first valve disc.

19. The method of claim 18, wherein the armature is arranged substantially perpendicular to the first valve body and the second valve body.

20. The method of claim 18, wherein the armature and the grooved linkage member are arranged substantially in parallel with the first valve body and the second valve body.

* * * * *